UNITED STATES PATENT OFFICE.

SAML. F. TRACY, OF NEW YORK, N. Y.

IMPROVEMENT IN PROCESSES FOR SMELTING COPPER ORES.

Specification forming part of Letters Patent No. 8,599, dated December 16, 1851.

*To all whom it may concern:*

Be it known that I, SAMUEL F. TRACY, of New York, in the county and State of New York, have invented and discovered a new and useful Improvement in the Method or Process of Smelting Copper Ores, of which the following is a full and exact description.

In smelting sulphureted, subsulphureted, and bisulphureted copper ores—

First. The ores, either with or without a previous process of calcination, are smelted in a reverberatory or any other furnace used for smelting copper ores, and when the ores are combined with an excess of silica, which is generally the case with the ores of this country, subsilicate of iron and lime are used as fluxes, which convert the silica into a fluid slag, forming a bi or ter silicate, and set the mat free. The slags from the second smelting, being subsilicates of lime and iron, are used with the silicious ores, thus extracting any copper that the slags contain, or which may be mechanically combined with them in consequence of their having been carelessly withdrawn from the furnace. The result of this smelting is a regulus or mat.

Second. The mat thus obtained is ground to a powder, and calcined for six or eight hours at a low heat so as to avoid agglomerating. It is then withdrawn from the calcining-furnace and allowed to cool.

Third. The mat is again calcined for twelve or sixteen hours, and then leached with water as long as any copper is dissolved.

Fourth. The mat is calcined a third time until it frees itself entirely from sulphur, which usually requires from eight to sixteen hours, and is again leached with water if any sulphuric acid has been generated and not been expelled by calcination, which is not often the case, provided the calcination has been properly conducted.

Fifth. The mat, which is a sulphuret of copper and iron, has been converted by calcination and leaching into oxides of copper and iron, and is smelted in combination with silica, carbonate of lime, and carbon, (silica in its minimum,) producing in about six hours metallic copper entirely free from iron. The oxide of iron being converted into a subsilicate of iron and lime, is used in the first smelting, as indicated in section 1.

That which I claim as my invention and discovery, and for which I ask Letters Patent, is—

1. The use, as a flux for ores combined with an excess of silica, of the subsilicate of iron obtained from the second smelting or from iron-furnaces.

2. The grinding of the regulus or mat to a powder, instead of merely breaking it into lumps or fragments, so that a perfect oxidation can be obtained, and leaching with water, which aids the oxidation and extracts the sulphuric acid when generated, as that acid greatly retards the refining process when combined with the metallic copper.

In witness whereof I have hereunto subscribed my name the 19th day of November, A. D. 1851.

SAML. F. TRACY.

In presence of—
J. CHAS. S. TRACY,
H. WARD BARNES.